7914y
Sheet 1-2 Sheets.
T. H. Sherman,
Brick Machine,
Patented Dec. 30, 1833.
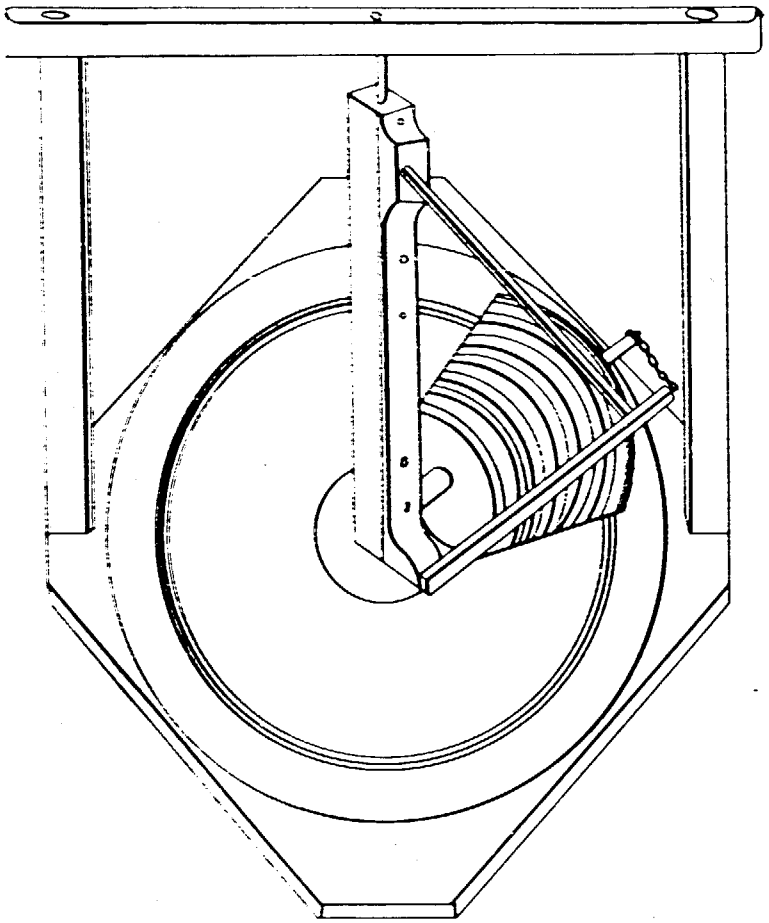

7914x
Sheet 2-2 Sheets.
T. H. Sherman,
Brick Machine,
Patented Dec. 30, 1833.
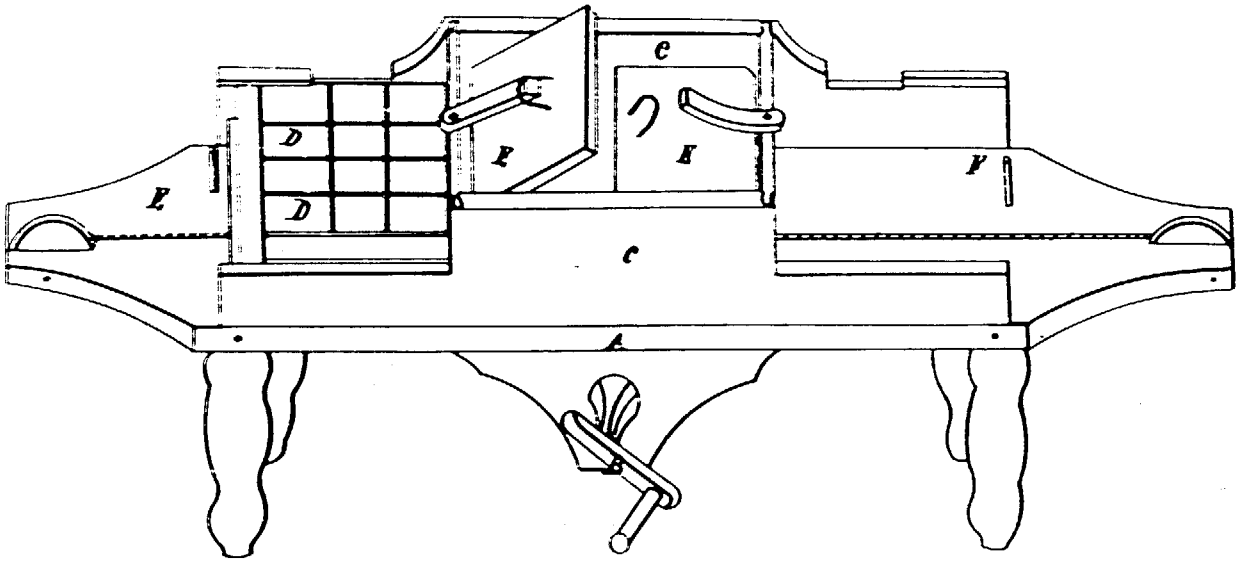

79144 X                Dec. 30, 1833                327

Thomas H Sherman [illegible] N.Y.

Letters Patent

The Schedule referred to in these Letters Patent and making part of the same containing a description in the words of the said Thomas H. Sherman [illegible]
of his Improvement in the composition of Mortar [illegible] making brick water proof
and fire proof and also the machine for the mixing of Mortar for brick &
also a Machine for moulding brick.

To all to whom these presents shall come be it known that I Thomas H. Sherman
of [illegible] in the County of [illegible] and State of New York have invented a new
and useful improvement in the manufacture of brick & that the following is a
full and exact description of the composition of the Mortar for making brick.
& also of the construction & operation of the said Machine as invented or improved
by me.          Composition of Mortar
Every barrel of water required for making Mortar add half a bushel
of [illegible] lime & half a bushel of salt & in that proportion for any
greater or less quantity of water that may be required to temper the Mortar
This composition will make brick that will stand in fire & in water.
The machine for mixing or treading Mortar may be
described as follows. A square or an octagon platform to be constructed with
[illegible] posts set up and connected at the top by a cross girt passing over the centre
of the platform as shown by letters DDD upon figure 1 [illegible] the annexed plate
in the centre of this platform a circular bed of twelve or more feet diameter for the
Mortar to be worked in is to be constructed and is shown by letter A. In the centre
of this [illegible] a shaft sustained at the top by the girt upon the top of the
post letter C upon the figure [illegible] this shaft a wheel or roller is to be con
structed with one end of the shaft thereof fastened by by a swivel to near the
foot of the upright shaft C. This wheel or roller to be composed of six or more
[illegible] the [illegible] to diminish in diameter from the outside in [illegible] proportion
as that by a revolution of the whole roller it shall turn round in the bed upon
its axis without leaving marks upon the surface connecting it with the upright

7914X

[illegible] These rims to be covered with band iron of about two inches width, the spaces between the rims to be about four inches. back of this roller and parallel to the axis of it is a bar. this bar is framed into the shaft & the outer end is fast to the shaft of the roller by an iron bar outside of the rim, it is also sustained by a brace from near the top of the upright shaft C to the outer end of the bar. In this bar are firmly set pieces of iron each like the coulter of a plough.

They are to [illegible] against the space between the rims [illegible] extend down into the mortar as low as the rims of the roller so as to cut each space of the mortar left between the rims; similar pieces of iron are also fasten into the bar [illegible] in between the spaces in the roller, they may be as near the width of the spaces as convenient and are intended to clear the mortar from the roller as it revolves, the mortar [illegible] out from the spaces in the roller by these pieces of iron or cleaners will drop down and be cut by the Colters: this part of the machine is shewn by figure C & D upon the annexed plate. This roller to be turned by a horse travelling upon the platform around the mortar bed.

The second machine is for moulding the brick and is shewn by figure [illegible] of the annexed diagram; a suitable platform or bench as BB in said figure is to be constructed standing upon four legs: a pulley [illegible] D at each end of the bench: A carriage is to be made to run upon this bench and to be of such size as that half of it should hold eight ordinary moulds for bricks. A rope is to be fastened to each end of this carriage & pass over the pulleys around a shaft or windlass under the center of the bench.

This windlass turned by a common Crank one way & the other will move the carriage one way & the other upon the bench. The carriage is to run on small wheels to make the motion easy and regular. Two planks are to be set upon the bench between which the carriage is to run they are to be of such length as the carriage shall run upon the bench. It is intended that the carriage should fit as closely to these plank as will allow it to run smoothly. The plank upon the side next the mask [illegible] where the man stands who works the machine to be cut down at each end so as to admit the moulds to be slipped off sideways for the purpose of being carried & emptied. In the middle these plank are to be considerably higher than the carriage so as to form the sides of a kind of hopper into which it is intended to throw

[illegible] 529 the mortar for the purpose of moulding. The two [illegible] with gudgeons in these plank marked C upon the diagram when raised up as shown upon the diagram are intended to form the two other sides of the hopper. These lids are intended to shut down toward each other upon the moulds on the carriage & to [illegible] to shut down so as not touch one another & close all the space over the moulds between the plank. When these lids are open as shown upon the figure the empty moulds are to be run upon the carriage under the space or hopper formed by raising the lids & sufficient mortar to be thrown into the hopper to fill the moulds and which when [illegible] pressed down by closing the lids will completely fill the moulds. The lids then to be raised up and the carriage moved by the [illegible] towards the end of the track. The lower edge of the lid or that end will operate as a striker & the moulds thus completely filled will be presented against the space in the plank at the end ready to be taken off and emptied.

It is intended that the carriage shall be so worked and [illegible] as to allow the moulds to be taken off at each end of the track or at each side of the man working the machine. There should be springs bearing down upon the gudgeons of the lids to keep them in place & to admit them to rise should a stone or other thing be accidentally thrown into the hopper with the mortar.

The whole track and machine may be so constructed as to be easily moved to such part of the mortar bed as may be most convenient. I claim to have discovered the composition above described for making brick and to be the inventor of the two machines above described [illegible]

Witnesses
John Wilkinson
J.D. [illegible]

Thomas H [illegible]

(Dr. in Portfolio)

([illegible])

([illegible] [illegible] 1838)